US007059434B2

(12) United States Patent
Bares et al.

(10) Patent No.: US 7,059,434 B2

(45) Date of Patent: Jun. 13, 2006

(54) HAND CONTROLS FOR SMALL LOADER

(75) Inventors: Mark F. Bares, Oakes, ND (US); William A. Wright, Gwinner, ND (US)

(73) Assignee: Clark Equipment Company, WoodCliff Lake, NJ (US)

(*) Notice: Subject to any disclaimer, the term of this patent is extended or adjusted under 35 U.S.C. 154(b) by 0 days.

(21) Appl. No.: 10/889,797

(22) Filed: Jul. 13, 2004

(65) Prior Publication Data

US 2005/0011696 A1 Jan. 20, 2005

Related U.S. Application Data

(60) Provisional application No. 60/487,149, filed on Jul. 14, 2003.

(51) Int. Cl.
*B62D 51/04* (2006.01)

(52) U.S. Cl. .................. 180/19.1; 180/19.2; 180/19.3; 180/6.2; 180/6.7; 180/9.1; 180/9.22; 180/6.48

(58) Field of Classification Search ............... 180/19.1, 180/19.2, 19.3, 6.2–6.7, 9.1, 9.22, 6.48, 16.7
See application file for complete search history.

(56) References Cited

U.S. PATENT DOCUMENTS

| | | | | |
|---|---|---|---|---|
| 3,540,220 A | | 11/1970 | Lauck | 60/19 |
| 3,677,362 A | | 7/1972 | Chatterjea | 180/6.48 |
| 3,688,858 A | * | 9/1972 | Jespersen | 180/9.62 |
| 3,792,744 A | * | 2/1974 | Gray | 180/6.48 |
| 4,184,712 A | | 1/1980 | Skahill | 296/190 |
| 4,244,427 A | | 1/1981 | Enters et al. | 172/42 |
| 4,396,067 A | | 8/1983 | Enters et al. | 172/42 |
| 4,399,882 A | | 8/1983 | O'Neill et al. | 180/6.48 |
| 4,408,672 A | | 10/1983 | Albright et al. | 180/189.14 |
| 4,559,844 A | | 12/1985 | Mor | 74/471 |
| 4,572,019 A | | 2/1986 | Suzuki | 74/471 |
| 4,691,795 A | | 9/1987 | Wehmeyer et al. | 180/6.48 |
| 4,864,805 A | | 9/1989 | Hager et al. | 56/11.9 |
| 4,940,280 A | | 7/1990 | Templeton | 296/190 |
| 5,131,483 A | | 7/1992 | Parkes | 180/6.48 |
| 5,146,735 A | | 9/1992 | McDonner | 56/11.3 |
| 5,181,579 A | | 1/1993 | Gilliem | 180/6.48 |
| 5,212,896 A | | 5/1993 | Hillard et al. | 37/86 |
| 5,279,376 A | | 1/1994 | Yang et al. | 180/6.48 |
| 5,423,654 A | | 6/1995 | Rohrbaugh | 414/686 |

(Continued)

FOREIGN PATENT DOCUMENTS

EP 0 565 757 10/1993

(Continued)

*Primary Examiner*—Lesley D. Morris
*Assistant Examiner*—Marlon Arce-Diaz
(74) *Attorney, Agent, or Firm*—Westman, Champlin & Kelly, P.A.

(57) ABSTRACT

A control system for a small work vehicle such as a compact track propelled loader has a control handle that is mounted onto a swinging support plate. The support plate swings about a vertical axis positioned forwardly of the control handle, and the control handle is mounted on the support plate about a horizontal axis. Linkages are provided between the control handle and the pivotal mounting about the upright axis to respective motor control levers for operating motors on opposite sides of the vehicle for steering and propelling the vehicle. Moving the control handle about the horizontal axis causes a drive selectively in forward and reverse direction, and moving the support plate and the control handle about the vertical axis provides differential movement for steering control.

29 Claims, 9 Drawing Sheets

U.S. PATENT DOCUMENTS

| | | | | |
|---|---|---|---|---|
| 5,488,818 | A * | 2/1996 | Powers et al. | 56/11.4 |
| 5,511,367 | A | 4/1996 | Powers et al. | 56/11.2 |
| 5,518,079 | A | 5/1996 | Zvolanek | 180/19.1 |
| 5,644,903 | A | 7/1997 | Davis, Jr. | 56/10.8 |
| 5,647,721 | A | 7/1997 | Rohrbaugh | 414/686 |
| 5,816,348 | A | 10/1998 | Barnes | 180/6.2 |
| 5,848,520 | A | 12/1998 | Arfstrom et al. | 56/11.4 |
| 5,860,484 | A | 1/1999 | Kauss | 180/6.48 |
| 5,894,714 | A | 4/1999 | Braun et al. | 56/11.4 |
| 5,913,802 | A | 6/1999 | Mullet et al. | 56/10.8 |
| 5,957,229 | A | 9/1999 | Ishii | 180/6.48 |
| 6,082,083 | A | 7/2000 | Stalpes et al. | 56/11.6 |
| 6,098,385 | A | 8/2000 | Turk | 56/11.3 |
| 6,155,648 | A | 12/2000 | Dombek et al. | 291/1 C |
| D438,218 | S | 2/2001 | Mcllwraith | D15/25 |
| 6,397,967 | B1 | 6/2002 | Mcllwraith | 180/308 |
| 6,460,640 | B1 * | 10/2002 | Keagle et al. | 180/19.3 |
| 6,709,223 | B1 * | 3/2004 | Walto et al. | 414/685 |
| 6,832,659 | B1 * | 12/2004 | Bares et al. | 180/9.22 |
| 6,902,016 | B1 * | 6/2005 | Bares et al. | 180/19.3 |
| 2001/0008346 | A1 | 7/2001 | Martin | 296/190.08 |

FOREIGN PATENT DOCUMENTS

| | | |
|---|---|---|
| EP | 1 066 998 A2 | 1/2001 |

* cited by examiner

HAND CONTROLS FOR SMALL LOADER

This application claims priority on U.S. Provisional Application Ser. No. 60/487,149, filed Jul. 14, 2003, the contents of which are incorporated by reference in their entirety.

BACKGROUND OF THE INVENTION

The present invention relates to hand controls for controlling the steering, direction, and speed of movement of a loader that can be track propelled, although the controls also will work with wheel driven loaders as well as other powered vehicles. The controls operate separate drives for opposite sides of the vehicle where the speed on one side can be varied in relation to the other side for turning.

Various track propelled small loaders have been advanced. Some of these loaders also include ride on platforms, and usually the loader will be of the type that has lift arms with a bucket or other attachment at the front end of the lift arms. The drive train, particularly when using tracks on opposite sides of the loader, includes hydraulic motors that are controllable as to direction and rotational speed. The operator controls provide for individually controlling the motors on opposite sides of the loader or vehicle so that steering can be effected by differential movement between the ground engaging and driving members such as tracks on opposite sides of the loader. Moving a control handle in forward direction from a center position causes forward movement and moving the control rearwardly from the center position causes rearward movement. The speed of movement for motors that are controlled is proportional to the control handle displacement from the center position.

U.S. Pat. No. 6,460,640 shows this type of a control system, in a small loader.

SUMMARY OF THE INVENTION

The present invention relates to a control system for a vehicle, in one aspect shown, a track driven loader, with control components pivoting about upright and transverse axes. The control system is used for controlling the speed and direction of a vehicle, as shown with drives to opposite sides of the vehicle, and controlling steering the vehicle.

A support plate or platform forming a component of the control system is mounted for pivoting about a generally upright axis and a control handle is mounted on the support plate for movement about an axis transverse to the upright axis so the control handle that can be moved in forward direction or rearward direction for controlling direction of movement of the vehicle. The platform or support plate that is pivotally mounted about an upright axis can be swung from side to side about the upright axis to control steering of the vehicle. As shown in one aspect, operating the drives for the opposite sides of the vehicle at differential speeds can be used for steering. The movement about the upright axis provides motion for steering inputs. The amount of displacement of the control handle about the horizontal axis controls the direction and speed of movement for the loader. The upright axis is forwardly of the control handle axis. Suitable linkages are provided to transfer the movement of the support plate and control handle to steering and drive mechanisms.

The single control handle is associated with reference bars at the front and rear of the control handle to permit the operator to sense the amount of movement or displacement of the control handle from a reference position. The reference bars also permit the operator to have better control. The operator's hand on the reference bar stabilizes the hand relative to the control handle as the vehicle moves. The hand thus is provided a reference position even if the vehicle moves at a different velocity or direction from the operator for a short period of time.

The upright axis of movement of the support plate is in one aspect, a central axis of a shaft fixed relative to the vehicle, so the support plate does not substantially move fore and aft. The reference bars are thus anchored to the frame in fore and aft direction through the support plate and provide a steadying, stable reference for the operator to hold onto. The operator on a ride on platform can thus have a hand link to the vehicle.

The control handle is used for swinging the support plate about the upright axis for steering as well as pivoting about the transverse axis for direction and speed control.

Additionally, in another aspect of the invention, the maximum speed of the loader in at least one direction can be limited and different from the maximum speed in the other directions. Rearward speed is limited in the form disclosed, but forward speed can also be limited in the same manner.

The vehicle, called a loader, is provided with a panel that will move when it engages an object during longitudinal movement of the loader, to in turn move the controls to a neutral or stopped position. This will minimize the opportunity for the loader to move beyond a desired position toward a fixed object or an operator. The slowing is to stop rearward movement.

A centering mechanism is provided to return the drive motor controls to neutral when an operator releases the control handle. The centering mechanism is on a drive control lever right at the drive unit including the drive motor. The vehicle drives preferably as shown are swash plate type drive pump and motor units that are commonly used in loader drives where the speed is controlled by adjusting the pump output, which in turn, adjusts the associated motor speed.

The steering inputs and fore and aft drive controls can be used to move controls for electric drive motors and operate valve spools that can operate power steering or spool valve controlled drive systems. Variable speed mechanical or belt drive systems also can be controlled.

DETAILED DESCRIPTION OF THE PREFERRED EMBODIMENTS

Figure 1:
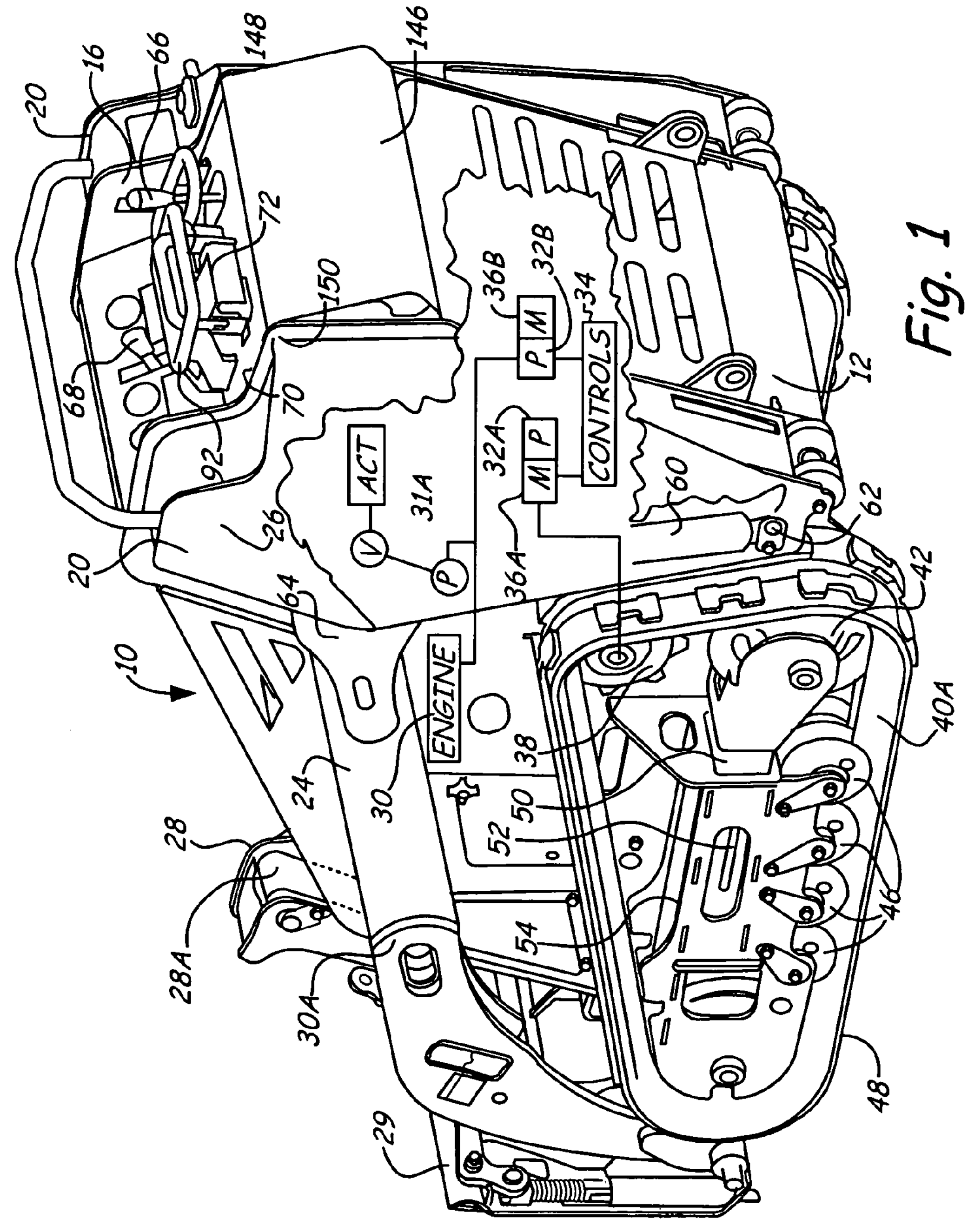
FIG. 1 is a fragmentary rear perspective view of a typical loader utilizing the controls of the present invention.
Figure 2:
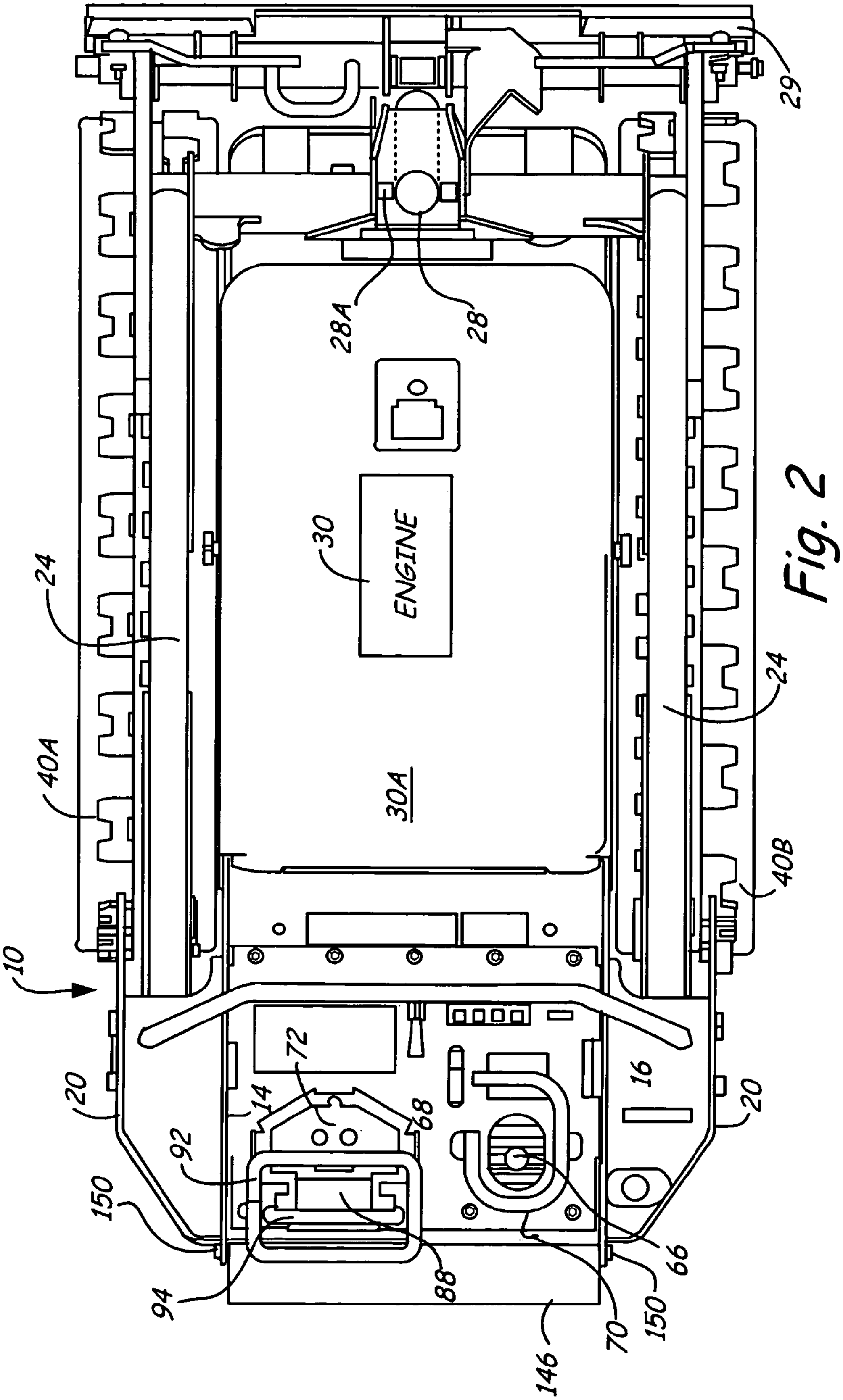
FIG. 2 is a top plan view of a typical loader using the controls of the present invention.
Figure 3:
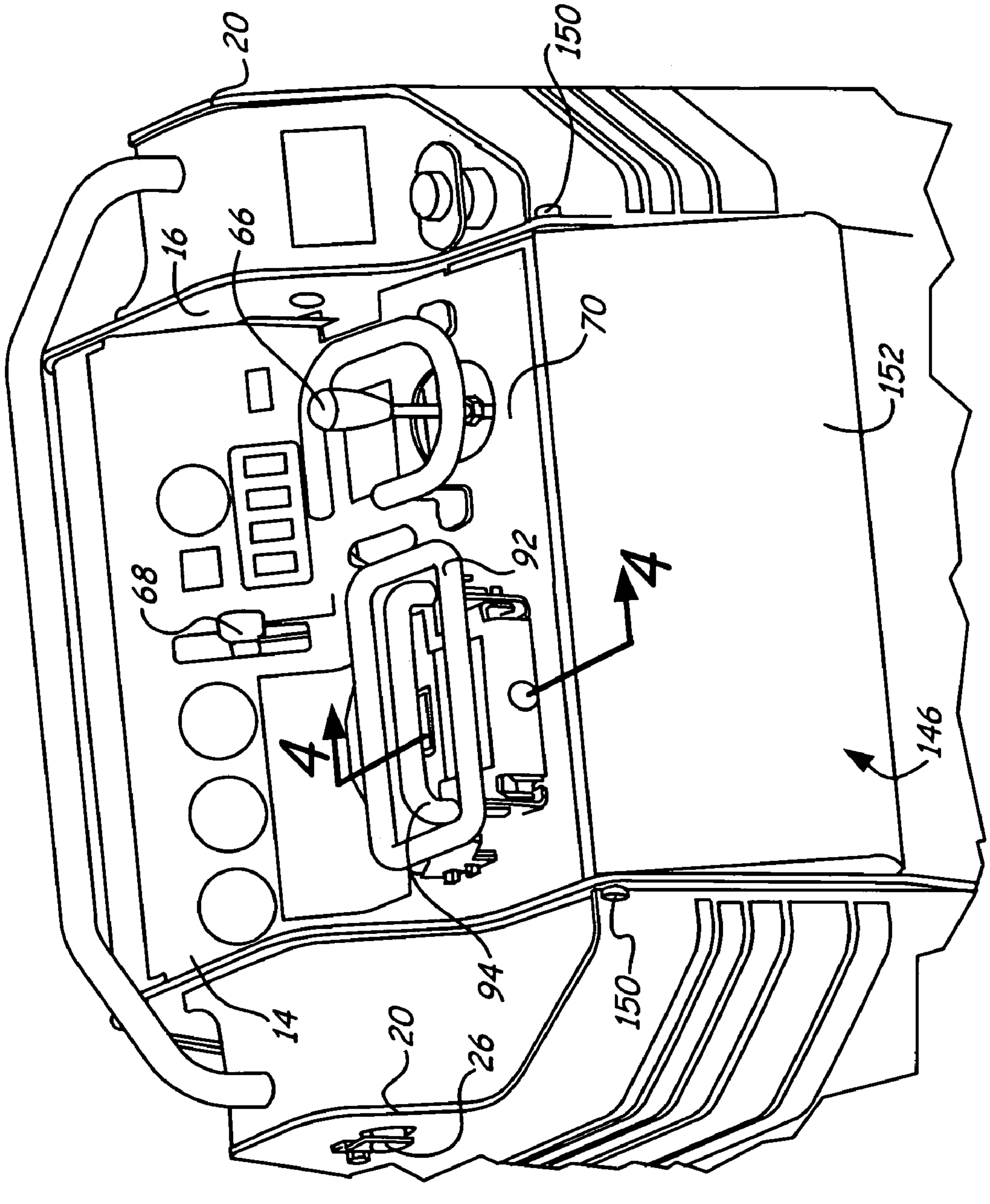
FIG. 3 is an enlarged rear perspective view of the control mounting on the loader of FIG. 1.

In FIGS. 1 and 2 in particular, a self-propelled vehicle as shown, small skid steer loader 10 is shown schematically and fragmentarily. FIG. 2 shows a top plan view of this loader. This type of a loader, is shown in U.S. patent application Ser. No. 10/284,432, filed Oct. 30, 2002, now U.S. Pat. No. 6,832,659, for a loader frame and bolt on track drive, the disclosure of which application is incorporated by reference. The loader or other vehicle can have a ride on platform attached at the rear as shown in U.S. patent application Ser. No. 10/753,739, filed Jan. 7, 2004, also incorporated by reference. The terms loader and vehicle are intended to include various self-propelled vehicle arrangements, and includes vehicles that have steerable wheels, as well as skid steer arrangements. The zero turn radius machines that are common in lawn and garden applications can be controlled with the present invention and are included in the term vehicle.

The loader has a frame 12 that supports upright side plates 14 and 16, on opposite sides of the loader. The plates 14 and 16 are part of the frame 12 and are joined with cross plates as needed, and can include lower cross plates that can form an operator's platform at the rear if desired.

The rear portions of the loader have side plates that are spaced from and parallel to the frame plates 14 and 16. One of the side plates is shown at 20. The spaces between the side plates 20, and the respective frame plates 14 and 16 are used for mounting a lift arm assembly 24. The lift arm assembly 24 is pivotally mounted as at 26 to the frame 12 and positioned in a desired location. The lift arm assembly 24 has individual lift arms, as shown, and a mast 28 is used for mounting a bucket control or tilt cylinder 28A for a loader bucket, or for other accessories that may be mounted on an attachment plate 29 at the front end of the lift arms.

The loader 10 has an internal combustion engine 30 mounted at an engine housing or compartment 30A that is used for driving a hydraulic pump 31 for the lift and tilt actuators 60 and 28A acting through suitable valves 31A. Auxiliary actuators also can be provided. Also, the engine drives pumps 32A and 32B, which are a part of a swash plate pump and motor unit as conventionally used.

The pump and motor units form ground drive systems including a motor and motor controls, which drive system can be electric or other types of controlled drive.

Hydraulic fluid under pressure from pumps 32A and 32B is provided to unitarily mounted motors 36A and 36B, respectively. The output of the pumps can be varied for speed control, and also reversed. The controls 34 include pump controls that are mounted right at the unitary pump and motor units. The pumps 32A and 32B are swash plate type pumps that are controllable to vary an output to in turn drive the associated motor in a selected direction of rotation, as well as varying the speed of the motor rotation. Movement of the pump control levers, which will be shown subsequently determines the direction of rotation and speed of the associated motor. The motor speed and direction is thus controlled by the position of the controls 34.

The motors 36A and 36B are used for propelling the loader by individually driving drive sprockets 38, on the sides of the machine, to in turn drive tracks 40A and 40B that are mounted on the sides of the loader. Tracks 40A and 40B are shown in FIG. 2. Wheeled loaders or vehicles would be driven with normal mechanical drive trains to the wheels, or can be operated with ground engaging wheels mounted right on motor shafts.

The tracks mount over suitable idler rollers, including a rear idler roller 42, as shown in FIG. 1. The tracks are supported on the ground with bogie wheels 46 that hold the lower reach or length 48 of the track in a suitable orientation.

The tension in the track is maintained with the slide 50 that mounts rear idler roller 42 and which is loaded with a spring 52 in a housing 54 attached to the track support frame on each side of the loader. A front idler roller is used for mounting the front end of the track.

Schematically shown is a hydraulic cylinder 60 that is typically used for raising and lowering lift arms, and which can be attached to the loader frame at the lower end shown at 62, and attached to the lift arms at a pivot on a bracket 64.

The control system that is shown generally at 34 (FIG. 4) is a drive and steering control assembly using a single control handle, so that an operator can steer and control speed and direction of movement of the loader with one hand, if desired, in a convenient manner. The controls are shown in more detail in FIGS. 2–8. It should be noted that a lever 66 can be provided for controlling the lift arm cylinder 60, and the valves for controlling other cylinders can be controlled as desired. A throttle 68 is provided for controlling the engine speed of engine 30.

Figure 5:
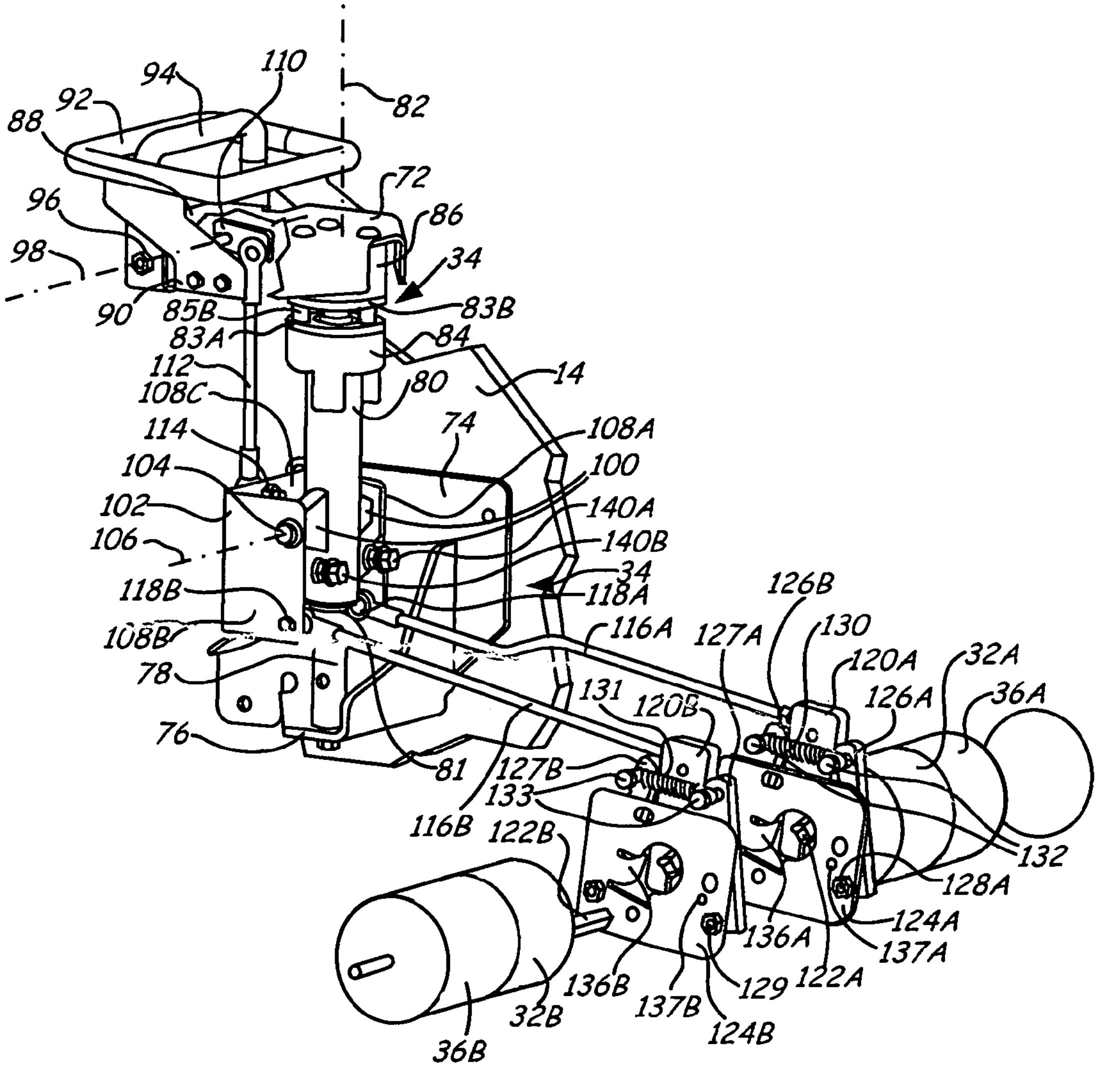
FIG. 5 is a fragmentive perspective view of the control arrangement, viewed in opposite direction from FIG. 4 with the loader shown only fragmentarily and with parts omitted for sake of clarity.

The controls 34 form an assembly supported relative to a control panel 70. The controls include a swinging or movable control handle support plate or platform 72. As shown in FIG. 5, for example, the side plate 14 of the loader has a main mounting bracket 74 supported thereon. The main mounting bracket 74 has a lower mounting flange 76 that extends laterally from the side plate 14. A vertical shaft 78 has a lower end supported on the flange 76. The shaft 78 extends upwardly and can be rotatably supported at the upper end in a suitable manner, relative to the side plate 14 or with a bracket to panel 70, which is fixed to the side plates. The shaft 78 is positioned at a desired location to position and mount the control support plate 72 in its proper location. The shaft 78 does not move relative to the frame except to rotate, and does not have to be vertical. It can incline somewhat for convenience.

The shaft 78 forms a main mounting support for the control assembly 34, and as can be seen in FIGS. 4–7, the shaft 78 rotatably mounts a sleeve or hub 80 is rotatably mounted on the shaft 78. The sleeve 80 is located in position axially along the shaft 78 with bearings held in place in a suitable manner, for example, with snap ring assemblies indicated at 81. The sleeve 80 is free to rotate about the axis 82 of the shaft 78. A hub 84 at the upper end of sleeve 80 has threaded bores receiving capscrews 81 for holding a support block 86 that mounts the control support plate 72, using suitable fasteners.

The control support plate 72 is securely fixed relative to the sleeve 80, so it will rotate about the axis 82 with the sleeve. The control support plate 72 extends rearwardly from axis 82 and has a control handle mounting section 88. The control handle mounting section 88 has side arms 90 fixed thereto and the side arms 90 in turn mount a fixed four sided reference bar or hand rest 92 that defines a center space and surrounds a movable control handle 94 located in the center space. The control handle 94 is pivotally mounted on a pivot shaft 96 to the handle mounting section 88 of the control support plate 72. The pivot shaft 92 is at the rear of the control support plate 72 and behind axis 80. The handle 94 will pivot about a generally horizontal axis 98 of shaft 96, which is transverse to and preferably perpendicular to axis 82. Handle 94 also can be moved about the axis 82 of upright shaft 78 from side to side, to cause the sleeve 80 to rotate as well.

The sleeve 80 has a pair of ears 100 that extend laterally from the sleeve near the lower end. A pivoting channel shaped bracket 102 is mounted on the ears 100 with suitable pivot pins 104 so that channel bracket 102 will pivot about a generally horizontal axis 106 of pins 104, that is parallel to the pivotal axis 98 of the control handle 94. The channel shaped bracket 102 extends downwardly from the pivot pins 104 and axis 106. The side walls 108A and 108B of channel shaped bracket 102 extend rearwardly from pivot pins 104 so that a base or cross wall 108C that joins wall 108A and 108B is spaced from sleeve 80.

Figure 4:
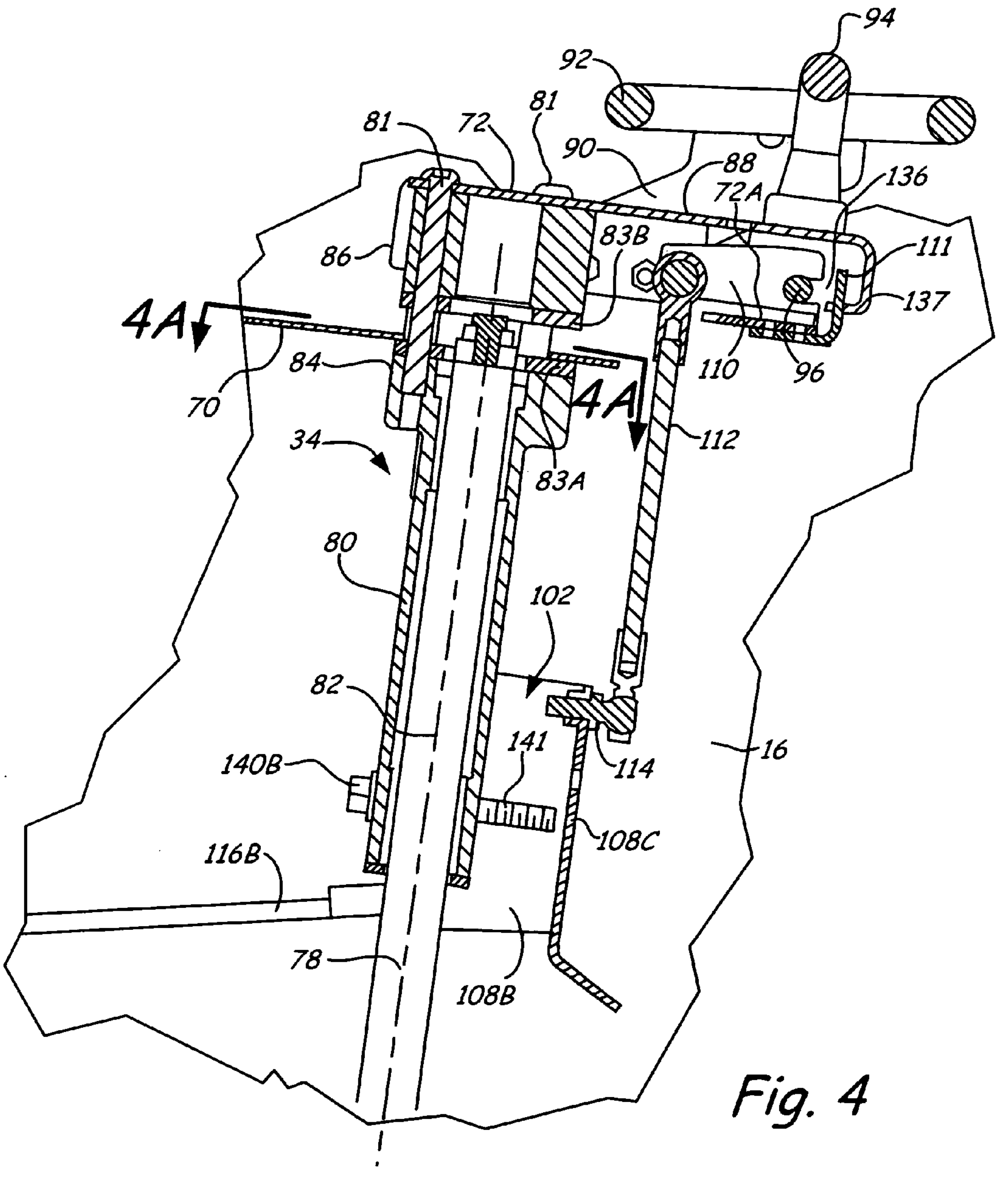
FIG. 4 is a side elevational view, viewed in the direction as indicated by line 4—4 in FIG. 3, of portions of the control system at a rear portion of a loader, with parts broken away.
Figure 4A:
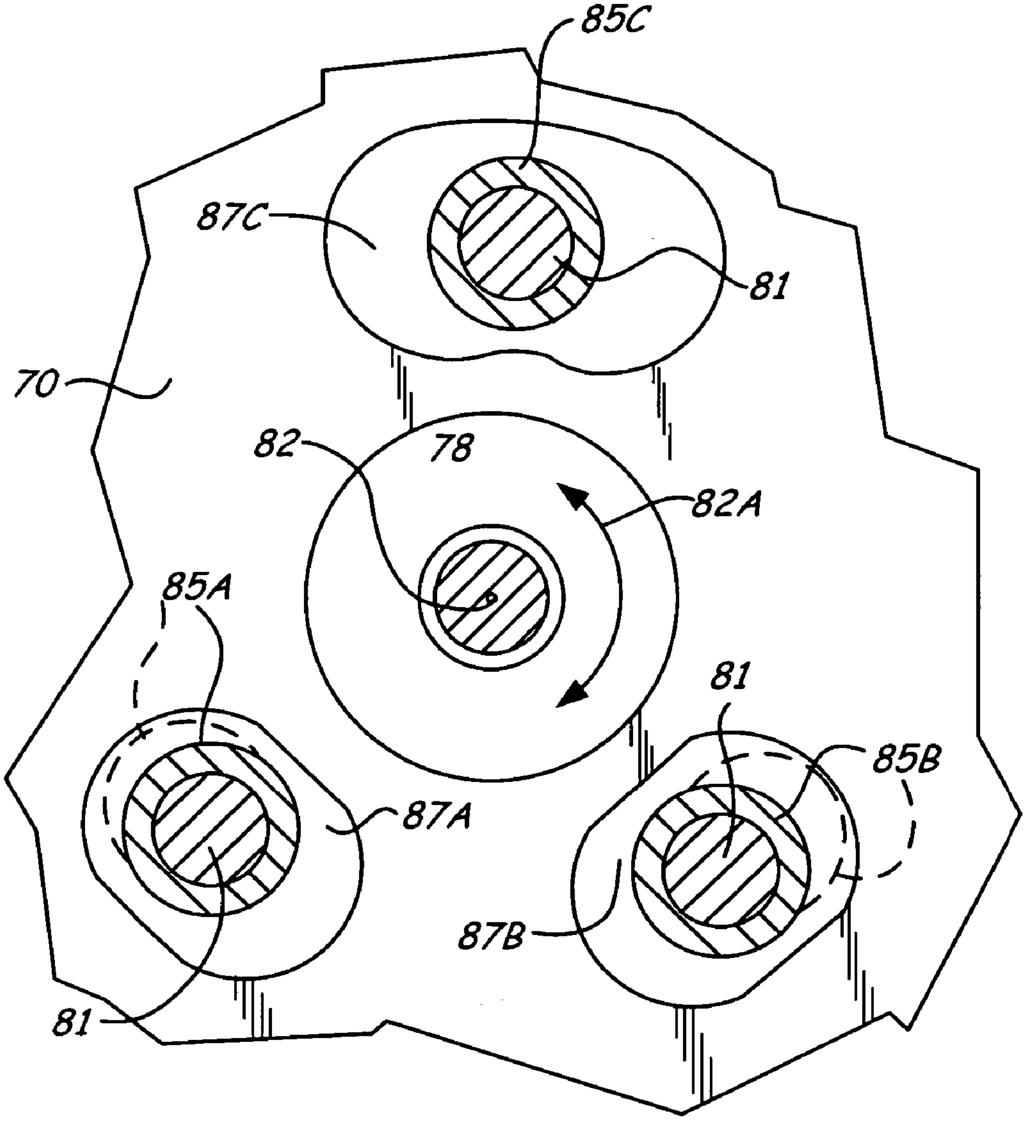
FIG. 4A is a fragmentary sectional view showing steering speed limiting stop slots in a fixed panel and taken on line 4A—4A in FIG. 4.

The extent of the differential motion between the drives on the opposite sides of the vehicle is preferably limited with cooperating stops. The support block 86 is supported on washer plates 83A and 83B separated by spacers 85A, 85B and 85C which pass through slots 87A–87C in the fixed control panel 70. As shown in FIG. 4A, the slots 87A and 87B are shaped and of length to provide steering speed stop surfaces when the support plate is pivoted about axis 82 of shaft 78. The steering motion is indicated by arrow 82A in FIG. 4A. The front slot 87C is longer and does not form a stop surface. The spacers 85A and 85B will contact one end surface of the respective slots 87A and 87B for the stopped positions.

Movement of the bracket 102 about the pivot pins 104 and thus the axis 106 is controlled by the control handle 94 pivoting about the parallel axis 98. The control handle 94 has a forwardly extending arm or lever 110 that is moved by the handle. A first end of a link 112 is connected to the arm 110. The link 112 also has a second end connected as at 114 to the upper portion of cross wall 108C of the bracket 102. Thus, when the handle 94 is pivoted, the arm 110 will move up and down, and will cause the bracket 102 to pivot about the axis 106. This will then cause the lower ends of the side walls 108A and 108B to move in an arc extending in fore and aft directions relative to the frame of the loader. This movement provides direction and speed control inputs to the drive system.

Movement of the lower corners of the side walls 108A and 108B is used to control the individual pump and motor units. In order to do this, a first link 116A and a second link 116B are connected at pivots 118A and 118B to the lower corners of the walls 108A and 108B, respectively. These links 116A and 116B in turn extend downwardly and are connected to control levers 120A and 120B of the pumps 32A and 32B that in turn control the motors 36A and 36B. The levers 120A and 120B are control levers of the purchased pump/motor assembly for swash plate controlled motors and form drive system control levers. The motors 36A and 36B are suitably mounted to the loader frame, so that the motors are fixed in position.

The motors 36A and 36B in turn have drive sprockets on output shafts that are used for driving the respective tracks in a conventional manner. The pumps 32A and 32B have control shafts shown in section in FIG. 5 for example at 122A and 122B that are part of a conventional pump/motor assembly. The levers 120A and 120B are mounted on the pump control shafts, and when the levers 120A and 120B are moved, the shafts 122A and 122B are also rotated to adjust the position of the swash plates of the pumps. The position adjustments are built-in controls of the pumps 32A and 32B and thus, the motors 36A and 36B. Moving the levers 120A and 120B from a centered position causes the motors to rotate in a corresponding direction and at a speed proportional to the displacement of the levers 120A and 120B from center.

The control levers 122A and 120B are spring loaded to be centered by a separate spring return lever arrangement for each of the pump and motor units. Plates 124A and 124B are used for supporting the centering levers and springs. The plates 124A and 124B are supported relative to the pump and motor units with suitable fasteners or the plates can be mounted directly to the loader frame, if desired. The plates 124A and 124B are fixed and each plate pivotally mounts a pair of spring loaded centering or return levers. Levers 126A and 126B are pivoted on plate 124A and levers 127A and 127B are pivotally mounted on plate 124B, for centering the pump control levers 120A and 120B of the respective pump and motor units, which centering action returns the pumps and thus the motors to a stopped or neutral position.

The levers 126A and 126B are pivoted onto the plate 124A at pivots 128 and levers 127A and 127B are pivoted on plates 124B at pivots 129. A spring 130 is connected between pins 132 on levers 126A and 126B. A separate spring 131 is attached in a suitable manner onto pins 133 on levers 127A and 127B. The springs 130 and 131 each provide a spring load tending to urge the upper ends of the respective pairs of spring centering levers 126A and 126B, and 127A and 127B together. This action will move the respective pump control lever 120A and 120B to a centered position.

The upper ends of the pair of spring centering levers 126A and 126B bear against the opposite edges of pump control lever 120A. The upper ends of the pair of spring centering levers 127A and 127B bear against the opposite edges of pump control lever 120B.

The spring centering levers are stopped from moving together when they reach the centered position of the lever. For example, levers 126B and 127B engage stops 136A and 136B. The spring centering levers 126A and 127A engage stop pins 137A and 137B that protrude out from plates 124A and 124B to form a stop for these levers. The stops prevent movement of one lever toward the other lever of the pair beyond the positions shown in FIG. 5. Thus, if the pump control lever 120A moves rearwardly from the position of FIG. 5, centering lever 126B would move rearwardly as well, and since centering lever 126A is against stop pin 137A, the spring 130 would extend. As soon as the external force (on lever 94) causing the lever 120A to move is relieved, the spring 130 would force control lever 120B and control lever 120A back to the neutral position of FIG. 5. Spring 131 acts in the same manner to center the levers 127A and 127B.

A spring return to a centered position for the motor control levers 120A and 120B is provided in a similar manner in both directions of movement of the pump control levers which in turn control the drive motors. The motor control levers are in a neutral or no-drive position when centered.

A feature of having the spring centering or return to neutral function right at the pump and motor drive units is that if a control link becomes unfastened or loose, the motor will be stopped by the spring centering, right at the pump or motor control. This same centering of control levers or valves can be used for different forms of drives.

Movement of the drive system or pump control levers 120A and 120B in fore and aft directions is caused by moving the control handle 94 about the axis 98, or pivoting the handle mounting portion 88 of the support plate 72 about the axis 82. Axis 82 is ahead of the reference bar 92 and the control handle 94, so that the control handle 94 will swing from side to side when the support plate 72 is pivoted about the axis 82.

It can be seen, therefore, that if the control handle 94 and support plate 72 are swung to the right or left about the axis 82, there will be differential movement in fore and aft directions of the side walls 108A and 108B which provide steering inputs. In other words, if the movement was clockwise about the axis 82, as shown in FIG. 5, the side wall 108B would move rearwardly and the side wall 108A would move forwardly. This would cause corresponding movement of links 116A and 116B and also the control levers 120A and 120B. There would be a differential in the movement of direction of rotation and drive speed of the motors controlled by the respective control levers 120A and 120B. One of the centering levers for each pump control lever would be moved to stretch the spring for that pair of centering levers. When the control handle is moved back toward center or is released, the centering levers and springs return the pump control levers to center. Movement of control bracket 88 in a counter-clockwise direction about the axis 82 would result in the opposite movements of the walls 108A and 108B and the respective pump control levers 120A and 120B, so that the motors would again operate in different direction and this would cause steering control for the vehicle driven by the motors.

If the vehicle being controlled has steerable wheels, the movement about the upright axis 82 can be used to operate a power steering valve for steering ground engaging wheels, and if such links are mounted to be pivoted about axis 106, the fore and aft movement of the lower ends of bracket 102 could have separated links used only for fore and aft movement and speed control. The steering and drive and speed control links would thus be separated.

Movement of the control handle 94 about the axis 98 with the control plate 72 centered will cause the link 112 to move up or down. Assuming that the control handle 94 is moved forwardly or in a forward direction, the link 112 would move down causing the bracket 102 to pivot about the axis 106 so that the pivots 118A and 118B and links 116A and 116B would move forwardly and simultaneous movement of the pump control levers 120A and 120B in a forward direction would result. The centering levers 126A and 127A would also move forwardly. The centering levers 126B and 127B are against stops 136A and 136B, so the springs 130 and 131 would be loaded.

Opposite movement of the control handle 94 would cause opposite movement of the pump control levers 120A and 120B through the movement of bracket 102 and the links 116A and 116B.

When the control handle 94 is released, the springs 130 and 131 acting on the spring centering of return levers will cause the pump control levers 120A and 120B to return to the neutral position.

If desired, the amount of movement of the control handle 94 in a reverse (or forward) direction can be controlled so that the maximum speed of movement of the loader in longitudinal direction can be limited. As shown, reverse speed is limited, but forward speed can be limited by stopping movement of the control handle in an opposite direction. Adjustable stops for limiting speed in both directions of movement also can be used. A mechanical adjustment member is provided which engages the operating linkage in a suitable manner to provide a stop for limiting the amount of movement of the control handle 94 when moving the loader in the selected direction.

Figure 7:
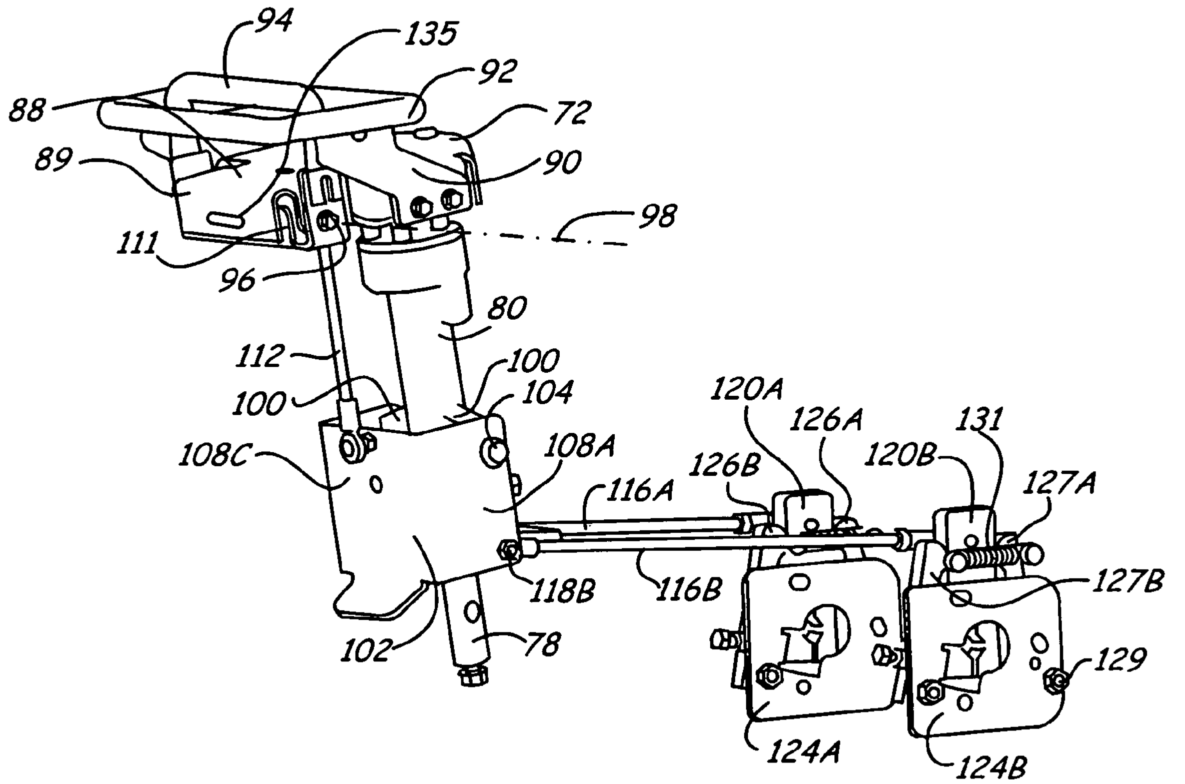
FIG. 7 is a rear perspective view of the control system as shown in FIG. 5.
Figure 8:
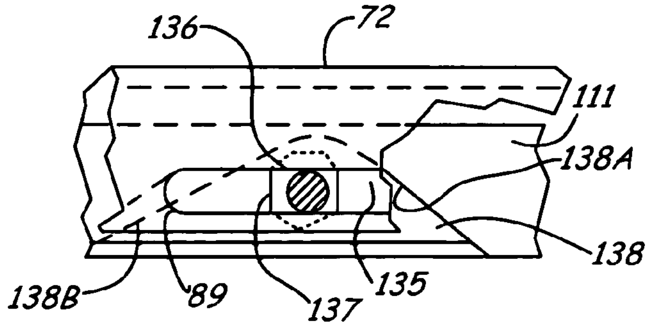
FIG. 8 is a schematic fragmentary view of the rear flange of the control handle support platform showing an adjustment for changing the maximum rearward displacement of the control handle.

A rearward stop for speed control is shown schematically in FIG. 8, wherein the control support plate 72 is shown fragmentarily with a depending flange 89 at the rear. Additionally, the lever 110 is provided with a rearwardly extending bracket having an upwardly extending flange 111 that is positioned just inside the flange 89, as can be seen in FIG. 7.

Flange 89 is provided with a horizontal slot 135, and a threaded pin 136 is locked in the slot. The pin can be adjusted along the length of the slot. The protrusion of the pin 136 is illustrated in FIG. 4, where the pin end is shown to extend inwardly past the upright extending flange 111.

Lock nuts shown at 137 can be used for holding the 136 pin axially in position, and the pin thus can be adjusted manually so that the position of the pin 136 along the slot 135 can be changed.

The horizontal slot 135 aligns with an open triangular-shaped recess 138 that is formed in the flange 111. The recess 138 has outwardly-extending, tapered edges 138A and 138B that are shown in dotted lines and in solid lines in FIG. 8. The edges extend from a center peak. Only one tapered edge needs to be provided.

Since the flange 111 will move up and down as the handle 94 is pivoted about the axis of the pin 96, the protrusion of the stop pin 136 will engage one of the edges 138A or 138B, depending on the position of the pin, to stop movement of the handle rearwardly, and thus stop movement of the control levers for the pumps that regulate the speed of the motors.

While the showing in FIG. 8 is schematic, it can be seen that the triangular recess 138 can be open to the bottom, so that forward motion of the handle 94 which will raise the flange 111 is not restricted by the pin 136. Oppositely facing stop edges would be used for limiting forward speed.

The difference in the rearward speed can be adjusted, again, by moving the threaded stop pin 136, along the slot 135, and tightening it in position so that one edge 138A or 138B will engage the pin as the handle 94 is pivoted rearwardly to restrict rearward speed.

Again, only one inclined edge, such as 138A, can be used as a sole stop. The angle of inclination of the edge relative to the long axis of slot 135 will provide for the sensitivity of the adjustment in speed as the pin 136 is moved along the slot 135.

Figure 9:
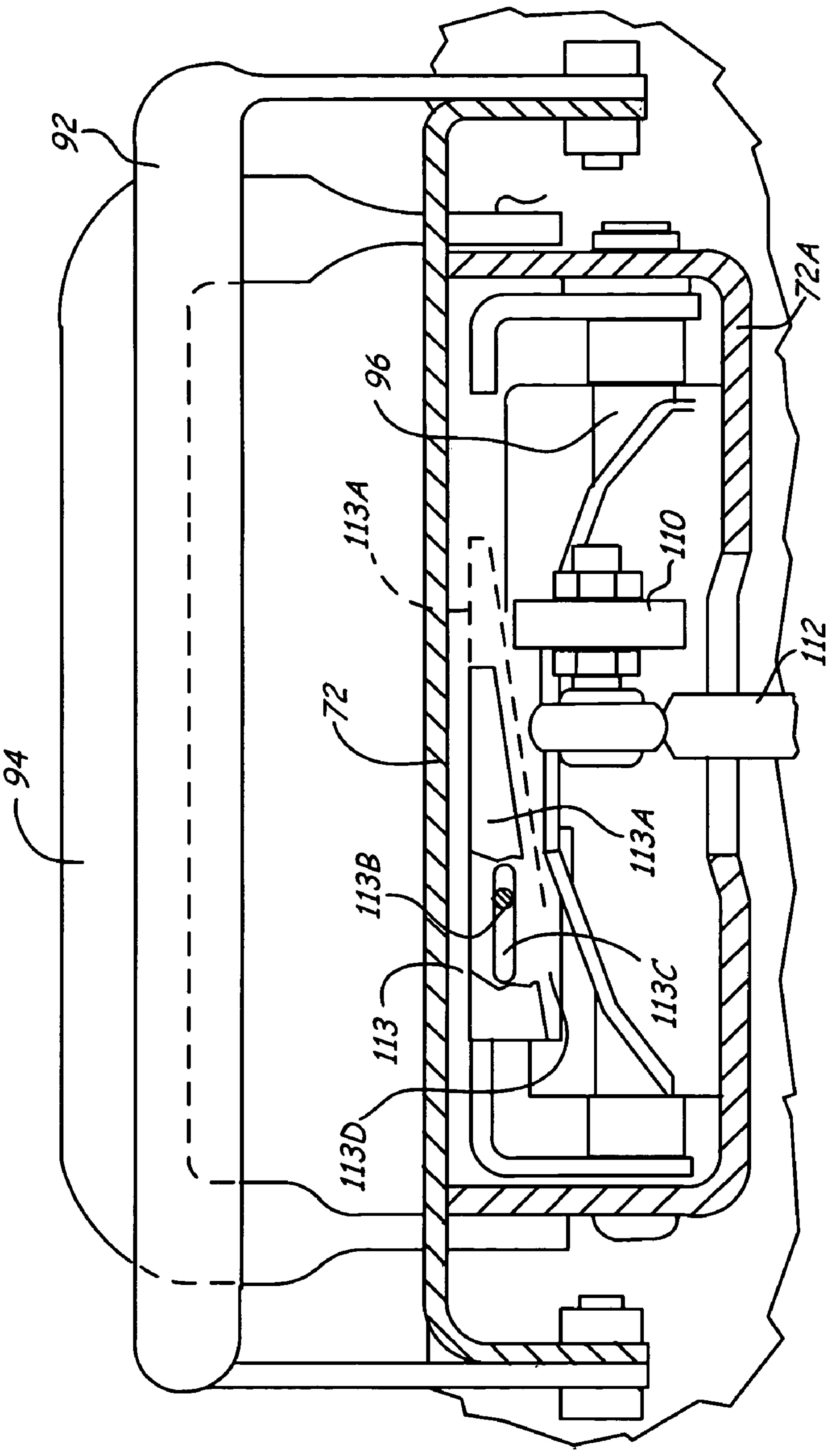
FIG. 9 is a fragmentary sectional view of a different form of a stop for limiting rearward displacement of the control handle, and looking rearwardly from ahead of link 112 in FIG. 9.

The rearward speed limiting control also can be accomplished with a wedge shaped stop 113A on the front of a plate 113 which is slidably mounted on the plate 72 for lateral movement. The wedge 113A has a tapered lower edge that engages the upper edge of the arm 110. This is shown schematically from the front in FIG. 9. The plate 113 can be retained laterally in position limiting movement of the upper edge of the front end of arm 110 with a bolt or hand screw 113B at the rear (where the pin 136 is located). The bolt 113B can slide laterally in a slot 113C that is on a depending flange 113D of plate 113 for adjustment of the rearward speed limiting position. The movement of the tapered lower edge of wedge 113A is similar to movement of one of the edges 138A and 138B.

It also can be noted that if the motor speed is at a maximum speed when the control handle 94 is centered about axis 82 (for straight ahead vehicle movement) and is all the way forward, steering movement with the control handle 94 all the way forward would be difficult. In order to provide a controlled maximum speed and still have the ability to change the direction of movement of the loader by increasing the speed of one of the drive motors and decreasing the speed of the other, linkage stops are provided on the hub or sleeve 80, which will engage the aligned side portions of the back panel 108C of the bracket 102.

As explained, the rotation of the support plate 72 is limited by the ends of slots 87A–87B in panel 70 being engaged by the spacers 85A–85B. Thus, the forward speed can be maintained while the sharpness of the turn is limited.

Referring to FIGS. 4 and 5, it can be seen that the sleeve 80 has a pair of laterally-extending ears on which threaded stop pins 140A and 140B are mounted. These pins protrude out to the rear of the sleeve 80, and are aligned with the back wall 108C of the bracket 102. In FIG. 4, the stop pin 140B is illustrated, and it can be seen that the end 141 of the stop pin 140B extends rearwardly of the sleeve 80. The end 141 of the pin will engage the inner surface of the rear wall 108C of the bracket 102, when the link 112 has been pushed downwardly so that the wall 108C pivots in toward the sleeve 80 in its lower portions. When the wall 108C engages the end portion 141 of either one of the stop pins 140A and 140B, or both, the position will result in the maximum straight ahead speed obtainable with movement of the handle 94 in a forward direction.

However, if the control levers 120A and 120B still are capable of being moved forwardly an additional selected amount, that means that the motors that are controlled by these levers 120A and 120B also can be run faster than the maximum speed controlled by the stop pins 140A and 140B. Thus, if forward movement of the handle 94 and thus the forward speed of the motor is at the stop position against the end portions 141 of the pins 140A and 140B, and the control support plate 72 is pivoted about the axis 82, the link 116B, for example, can move forwardly even though the bracket 102 cannot pivot about the horizontal axis 106 of pins 104 to move the wall 108C forwardly. At the same time, the link 116A would be moved rearwardly, and differential drive speed for the tracks or wheels is obtained for steering control.

Swinging the control support plate 72 in an opposite direction would cause the link 116A to move forwardly, and since the lever 120A is not at its maximum speed position, it can move forwardly and the lever 120B can move rearwardly.

This provides for steering even when the pre-set maximum forward speed is being traveled in a straight line forward direction.

Figure 6:
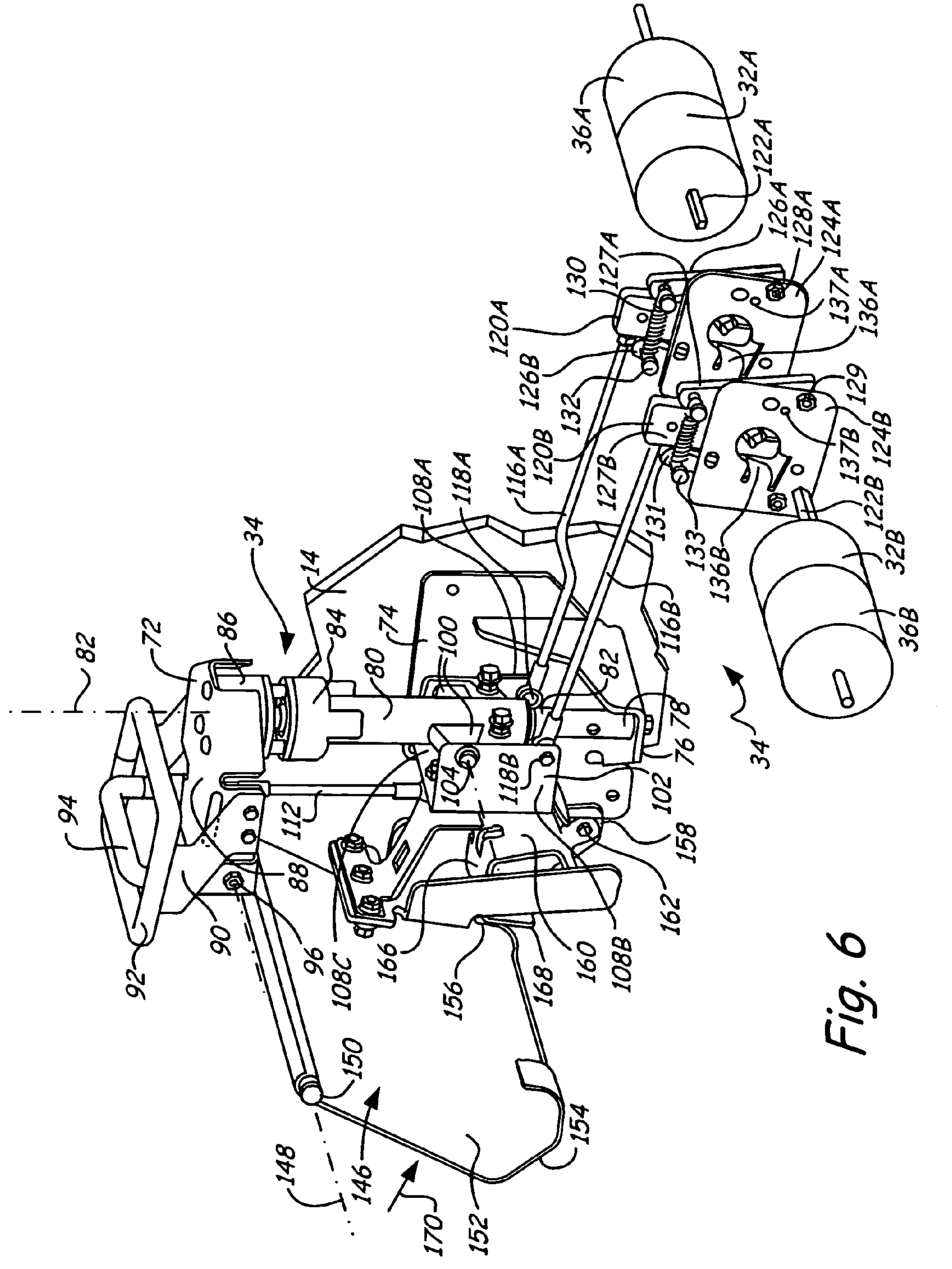
FIG. 6 is a view similar to FIG. 5, showing an anti-reverse panel that moves the controls to a neutral position when engaging an object.

Additionally, a mechanical drive linkage disabling or disengagement (stop) panel is utilized at the rear of the loader. A reverse stop panel is disclosed in U.S. patent application Ser. No. 10/071,559, filed Feb. 8, 2002, which is incorporated by reference. A shown, a panel 146 is pivotally mounted to the loader frame plates 14 and 16, or, if desired, to panel 70, about a horizontal axis 148 through suitable pins 150, as shown in FIG. 6. The panel 146 has a downwardly extending section 152, and a forwardly extending section 154 with one or more uprightly curved actuator fingers 156, at least one of which is in alignment with the shaft 78, and thus in alignment with the bracket 102. The mounting bracket 74 has a section 158 (FIG. 6) that supports a pivoting member 160 for pivoting about a horizontal axis with pins 162.

The bracket 160 has a rearwardly extending portion 166, and a downwardly extending actuator 168 that aligns with the center finger 156 on the panel 146. When a force such as that indicated by the arrow 170 engages the panel 146 on the vertical section 152, the panel 146 will pivot about the axis 148 in a direction that is toward the front of the loader and this will cause the finger 156 to act on the actuator 158 and in turn move the bracket 102 about its pivot so that the motor levers will move toward the front of the loader and will stop the rearward movement of the loader.

In this manner, the rearward movement of the loader can be automatically stopped if it engages an obstruction while it is moving rearwardly.

A panel like 146 also can be used at a forward end of a vehicle frame to stop forward drive if the vehicle engaged an object at a forward end of the frame.

The hand controls are illustrated at a rear of a loader for operator accessibility, but if the vehicle has an operator seat, the control system can be placed ahead of the operators seat in the mid-portions or front portion of the vehicle.

The pump and motor units, or other motor controls can be positioned to the rear of the hand controls, and to the rear of an operator that may be seated on the vehicle. The control links would be positioned at pivots located to provide forward and rearward movement of the vehicle when the control handle is moved forward and rearward.

Although the present invention has been described with reference to preferred embodiments, workers skilled in the art will recognize that changes may be made in form and detail without departing from the spirit and scope of the invention.

What is claimed is:

1. A work vehicle comprising:

a frame;

a source of power carried on the frame;

a traction system on the frame for propelling the frame in forward and reverse directions, and for steering and turning the frame, the traction system being coupled to the power source for operation and including separate drive motors, for driving traction elements on opposite sides of the frame, the motors having movable control members for controlling motor direction of drive and speed;

a control system for operating the traction system, including a control handle pivotally mounted on the frame on an uprightly extending support about a first stationary upright axis and mounted to an upper end of the support about a second axis perpendicular to the first axis, a bracket mounted on a lower portion of the support about a third pivot axis parallel to the second axis, the bracket having spaced wall portions, and a coupling link from the control handle to the bracket and second links from the wall portions to the control members for controlling the motors, the control members being moved by movement of the control handle about the first and second pivot axes of the control handle, and wherein the first axis is spaced forwardly of the second axis.

2. The vehicle of claim 1, wherein a spring return mechanism is coupled to each of the control members to return the control members to a centered neutral position when the control handle is released from external force.

3. The vehicle of claim 1, wherein the control handle is pivotally mounted on a support plate comprising the upper end of the uprightly extending support about the second axis.

4. The vehicle of claim 3, and a reference bar member fixed to the support plate, and including bar elements at a forward side and a rearward side of the control handle.

5. The vehicle of claim 4, wherein said support plate is mounted onto a sleeve, a fixed shaft supported relative to the frame, said sleeve being mounted on the fixed shaft for rotation about the first upright axis.

6. A work vehicle comprising a frame, a source of power carried on the frame, a traction system on the frame for propelling the frame in forward and reverse directions, and for steering and turning the frame, the traction system being coupled to the power source for operation, a control system for operating the traction system, including a control handle, a fixed upright shaft mounted on the frame, a sleeve pivotally mounted on the shaft about a first upright axis, the sleeve having an upper control handle support extending laterally from the sleeve, the control handle being pivotally mounted to the control handle support about a second axis, perpendicular to and spaced rearwardly from the first upright axis, the traction system including a pair of motors for driving traction elements on opposite sides of the frame, respectively, and a coupling from the control handle to control levers that are pivotally movable for controlling the motors, the control levers being moved by movement of the control handle about the second axis, a pair of links pivotally mounted to a lower portion of the sleeve about a third axis substantially parallel to the second axis, said links extending to be mounted to the control lever for a respective motor for controlling propelling of the vehicle.

7. The vehicle of claim 6, including a bracket supported on the sleeve for pivotal movement about a fourth axis, the pair of links being pivotally mounted to the bracket about the third axis at laterally spaced locations and the third axis being spaced from the fourth axis of the mounting of the bracket to the sleeve.

8. The vehicle of claim 7, wherein said control handle has an arm mounted thereon, a link between the arm and the bracket on the sleeve, such that movement of the control handle about the second axis controls movement of the bracket about the fourth axis.

9. The vehicle of claim 8, wherein the bracket has a base wall and a pair of spaced legs on the base wall and positioned on opposite sides of the sleeve, the legs being pivoted to the sleeve at the fourth axis and the links being pivoted to the legs about the third axis, whereby movement of the control handle about the upright axis causes differential movement between the links in fore and aft direction.

10. The vehicle of claim 3, wherein the control handle has a member thereon that moves relative to the support plate about the second axis when the control handle is pivoted about the second axis, and an adjustable stop on the support plate to engage the member and limit rearward pivoting of the control handle.

11. The vehicle of claim 3, wherein there is a first member extending outwardly from the second axis which is moved by the control handle as the control handle is pivoted about the second axis, and a wedge shaped second member having an edge inclined relative to and adapted to be moved to engage the first member at selected positions of the inclined edge to stop movement of the control handle in at least one direction at positions determined by the position of the inclined edge laterally of the first member extending outwardly from the axis of the control handle.

12. The vehicle of claim 1, and a panel pivotally mounted on the frame and having a portion extending in a first longitudinal direction from the frame, said panel including a portion that engages a part of the coupling between the control handle and the control members to cause the traction system to be returned to a neutral position when the pivoting panel is pivoted in a second opposite longitudinal direction relative to the frame more than a selected amount.

13. A self-propelled work vehicle comprising:

a frame having a longitudinal axis extending forwardly and rearwardly between a front and rear of the frame;

a source of power on the frame;

a traction system carried on the frame for propelling the frame in forward and reverse directions and for steering and turning the frame, comprising separately controlled motors that drive ground engaging supports on opposite sides of the frame; and a control system on the frame for controlling operation of the motors, the control system comprising a support plate pivotally mounted about a first upright axis, a control handle pivotally mounted on the support plate about a second axis spaced rearwardly of and substantially perpendicular to the first upright axis, and a linkage from the control handle and support plate to control the traction system, whereby movement of the control handle about the second axis controls forward and reverse directions of movement of the frame, and rotating the support plate about the first upright axis causes steering movement of the frame.

14. The vehicle of claim 13, wherein the control handle forms a hand grip and at least two transverse bar sections fixed to the support plate and positioned ahead of and behind the control handle, respectively.

15. The vehicle of claim 14, wherein the controls for the traction system include movable levers pivotally mounted adjacent the motors, the levers being pivotable by the linkage from a center non-driving position in forward and rearward directions to control direction and speed of rotation of the associated motor, a spring loaded mechanism located adjacent the motors for centering each of the levers when the control handle is released from external force.

16. A self-propelled work vehicle comprising:

a frame having a longitudinal axis extending forwardly and rearwardly between a front and rear of the frame;

a source of power on the frame;

a traction system carried on the frame for propelling the frame in forward and reverse directions, and a steering system for steering the frame; and a control system for controlling forward and reverse movement and steering of the frame, the control system comprising a support pivotally mounted about a first generally upright axis, and a control handle pivotally mounted on the support plate about a second transverse axis, a linkage including a bracket moveable with the support about the upright axis and including differentially moving first links for providing steering signals when the support is pivoted about the upright axis, the bracket being pivoted about a third transverse axis parallel to the second transverse axis, the linkage having a connection from the control handle to the bracket, wherein pivoting the control handle about the second axis pivots the bracket about the third axis to operate drive controls selectively to cause forward and reverse movement of the frame.

17. The vehicle of claim 16, wherein movable levers are provided to form drive controls for separate motors on opposite sides of the frame and comprising portions of the traction system, the levers being pivotable by the linkage from a center non-driving position selectively in forward and reverse directions when the bracket is pivoted about the third axis.

18. The vehicle of claim 17, wherein the differentially moving links are connected to the levers to separately drive the respective motor for steering control.

19. The vehicle of claim 18, wherein the differentially moving links are offset from the third axis in an upright direction and actuate the levers in forward and reverse directions.

20. The vehicle of claim 16, wherein the differentially movable links are connected to controls that provide power to steer the vehicle.

21. The vehicle of claim 16, wherein the support plate is mounted on an upright pivot that is fixed to the frame, and the second axis being rearwardly of the first upright axis.

22. A vehicle comprising:

a frame having a longitudinal axis extending forwardly and rearwardly between a front and rear of the frame;

a source of power on the frame;

a traction and steering system carried on the frame for propelling the frame in forward and reverse directions, and for steering the frame, and a control system for controlling forward and reverse movement and steering of the frame, the control system being coupled to the traction and steering system and comprising a support pivotally mounted with respect to the frame about a first upright axis, a control handle pivotally mounted on the support about a second axis transverse to the upright axis, a linkage moving with the support about the upright axis and pivoted about a third axis parallel to the second axis and movable when the control handle is pivoted, movement of the control handle about the second axis causing portions of the linkage to pivot about the third axis and control forward and reverse movement of the frame, and wherein moving the support about the first upright axis steers the frame.

23. The vehicle of claim 22, and operating stops between the frame and the support for limiting movement of the support about the first upright axis from a centered neutral position.

24. The vehicle of claim 22, wherein there is an adjustable stop to limit movement of the control handle in at least one direction of pivoting.

25. The vehicle of claim 22, and a moveable plate at the rear of the vehicle coupled to move the linkage to a neutral position when the vehicle is moving in a first direction and a portion of the movable plate moves in a second direction opposite from the first direction relative to the frame.

26. A control system for a vehicle having a frame;

a powered traction ground drive on the frame for propelling the frame in forward and reverse directions;

a steering linkage for steering the frame;

the control system comprising a support plate pivotally mounted with respect to the frame about a first upright axis and coupled to the steering linkage for steering the frame; and a control handle pivotally mounted on the support plate about a second axis transverse to the upright axis and coupled to the powered traction ground drive to propel the frame selectively in forward and reverse directions.

27. The control system of claim 26, wherein the upright axis is ahead of the transverse axis.

28. The control system of claim 27, wherein the upright axis is on a pivot member fixed with respect to the frame.

29. The control system of claim 28, and at least one fixed reference bar fixedly mounted on the support plate and spaced from the control handle.

* * * * *